US007630110B2

(12) United States Patent
Horikoshi et al.

(10) Patent No.: US 7,630,110 B2
(45) Date of Patent: Dec. 8, 2009

(54) THREE-DIMENSIONAL HOLOGRAM IMAGE DISPLAY APPARATUS AND THREE-DIMENSIONAL HOLOGRAM IMAGE DISPLAY SYSTEM

(75) Inventors: Tsutomu Horikoshi, Kamakura (JP); Masaaki Fukumoto, Yokohama (JP); Toshiaki Sugimura, Yokohama (JP); Masashi Tsuboi, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 130 days.

(21) Appl. No.: 10/924,960

(22) Filed: Aug. 25, 2004

(65) Prior Publication Data

US 2005/0083559 A1 Apr. 21, 2005

(30) Foreign Application Priority Data

Aug. 25, 2003 (JP) ............................ 2003-208712
Jul. 23, 2004 (JP) ............................ 2004-216472

(51) Int. Cl.
*G03H 1/08* (2006.01)
*G03H 1/02* (2006.01)
*G02B 26/02* (2006.01)

(52) U.S. Cl. ................................ 359/9; 359/7; 359/237

(58) Field of Classification Search ..................... 359/9, 359/23, 900, 11, 7, 237; 382/300, 128; 345/590
See application file for complete search history.

(56) References Cited

U.S. PATENT DOCUMENTS 5,040,225 A * 8/1991 Gouge ........................ 382/128
5,227,898 A * 7/1993 Iavecchia et al. ............... 359/9
5,754,710 A * 5/1998 Sekine et al. ............... 382/300
5,757,522 A * 5/1998 Kulick et al. ................... 359/9

FOREIGN PATENT DOCUMENTS

JP 2000-232661 8/2000
JP 2001-34148 2/2001

OTHER PUBLICATIONS

Koki Sato, "Characteristics of Kinoform by LCD and its Application to Display the Animated Color 3D Image", SPIE, Practical Holography VIII, vol. 2176, XP-002336940, Feb. 1994, pp. 42-49.

(Continued)

*Primary Examiner*—Audrey Y Chang
(74) *Attorney, Agent, or Firm*—Oblon, Spivak, McClelland, Maier & Neustadt, L.L.P.

(57) ABSTRACT

A three-dimensional hologram image display apparatus displays a three-dimensional hologram image by use of computed interference fringe patterns. The three-dimensional hologram image display apparatus includes a light modulation device which has an electro-optical effect in which a refractive index is varied in accordance with an applied electric field intensity; and an electric field controller configured to record computed interference fringe patterns in the light modulation device by varying an electric field intensity applied to the light modulation device in accordance with the computed interference fringe patterns.

4 Claims, 14 Drawing Sheets

ELECTRODE 23
PIXEL ELECTRODE 23a
HOLOGRAM RECORDING DEVICE 21
LIGHT MODULATION DEVICE 25
ELECTRODE 24

OTHER PUBLICATIONS

Jun Amako, et al.; "Wave-front control using liquid-crystal devices", Applied Optics, vol. 32, No. 23, XP-000383336, Aug. 10, 1993, pp. 4323-4329.

Reiner Eschbach, "Comparison of error diffusion methods for computer-generated holograms", Applied Optics, vol. 30, No. 26, XP-000226957, Sep. 10, 1991, pp. 3702-3710.

Lucilla Croce Ferri, "Visualization of 3D information with digital holography using laser printers", Computers and Graphics, vol. 25, No. 2, XP-004232470, Apr. 2001, pp. 309-321.

Kipp Bauchert, et al., "Advances in liquid crystal spatial light modulators". Proceedings of the SPIE, Optical Pattern Recognition XIII, vol. 4734, XP-002336942, Apr. 2, 2002, pp. 35-43.

* cited by examiner

REFERENCE WAVE IRRADIATION APPARATUS
3b
REFERENCE WAVE B2
HOLOGRAM RECORDING DEVICE 21
INTERFERENCE FRINGE PATTERN RECORDING APPARATUS
2a
OBJECT WAVE A2
OBJECT WAVE A1
REFERENCE WAVE IRRADIATION APPARATUS
3a
REFERENCE WAVE B1
INTERFERENCE FRINGE PATTERN DISPLAY APPARATUS
12
4
IMAGE SIGNAL
INTERFERENCE FRINGE PATTERN COMPUTING APPARATUS 1

REFERENCE WAVE IRRADIATION APPARATUS
3
REFERENCE WAVE B
ELECTRODE 24
HOLOGRAM RECORDING DEVICE 21
OBJECT WAVE A
LIGHT MODULATION DEVICE 25
ELECTRODE 23
INTERFERENCE FRINGE PATTERN DISPLAY APPARATUS 2
ELECTRIC FIELD CONTROL UNIT 22
IMAGE SIGNAL
INTERFERENCE FRINGE PATTERN COMPUTING APPARATUS 1

PIXEL

| A | B | C | D | E | | | | | | | | | |
|---|---|---|---|---|---|---|---|---|---|---|---|---|---|

| GRAY-SCALE VALUE | VOLTAGE VALUE |
|---|---|
| 255 | +5V |
| 200 | +4V |
| 100 | +2V |
| • | • |
| • | • |
| • | • |

START
COMPUTE INTERFERENCE FRINGE PATTERNS
S401
TRANSMIT A IMAGE SIGNAL
S402
CONTROL THE INTENSITY OF AN APPLIED ELECTRIC FIELD
S403
RECORD INTERFERENCE FRINGE PATTERNS
S404
IRRADIATE REFERENCE WAVE
S405
DISPLAY THREE-DIMENSIONAL HOLOGRAM IMAGE
S406
END

OBJECT WAVE A
INTERFERENCE FRINGE PATTERN DISPLAY APPARATUS 2
SERVER 100
PACKET COMMUNICATION NETWORK
5

SERVER 100
1a
INTERFERENCE FRINGE PATTERN COMPUTING UNIT
1b
STORAGE UNIT
1c
TRANSMITTER UNIT
GRAY-SCALE VALUE
255
200
100
VOLTAGE VALUE
+5V
+4V
+2V

THREE-DIMENSIONAL HOLOGRAM IMAGE DISPLAY APPARATUS AND THREE-DIMENSIONAL HOLOGRAM IMAGE DISPLAY SYSTEM

CROSS REFERENCE TO RELATED APPLICATION

This application is based upon and claims the benefit of priority from the prior Japanese Patent Applications No. P2003-208712, filed on Aug. 25, 2003; and P2004-216472, filed on Jul. 23, 2004; the entire contents of which are incorporated herein by reference.

BACKGROUND OF THE INVENTION

1. Field of the Invention

The present invention relates to a three-dimensional hologram image display apparatus and a three-dimensional hologram image display system, each of which displays a three-dimensional hologram image by use of computed interference fringe patterns (computer generated hologram).

2. Description of the Related Art

Conventionally, a three-dimensional hologram image display apparatus has been known, which irradiates a reference wave onto a computer generated hologram displayed (played back) on a liquid crystal display (LCD) so as to reproduce an object wave, thus displaying a three-dimensional hologram image. Note that the computer generated hologram consists of interference fringe patterns obtained by a computation.

Specifically, as shown in FIG. 1, such interference fringe patterns are created from the object wave and the reference wave. The object wave is created in a manner that a laser beam irradiated onto an object of a three-dimensional shape is reflected thereon.

However, in such a conventional three-dimensional hologram image display apparatus, resolution of the LCD has limitations, and there has been a problem in that sufficient resolution for displaying a three-dimensional hologram image of the object of the three-dimensional shape cannot be obtained.

Specifically, resolution of 1 μm or less is required for displaying the three-dimensional hologram image of the object of the three-dimensional shape. However, even the highest-definition LCD at present only has resolution of approximately 10 μm.

Therefore, only a field of view (a range where the three-dimensional hologram image can be actually observed) with a width of several centimeters can be ensured, when an observer observes the three-dimensional hologram image from a point apart therefrom by 50 cm.

Accordingly, there has been a problem in that the conventional three-dimensional hologram image display apparatus does not have the sufficient resolution for displaying the three-dimensional hologram image of the object of the three-dimensional shape.

As a result, the conventional three-dimensional hologram image display apparatus has had a problem in that the three-dimensional hologram image of the object of the three-dimensional shape can be observed only by use of a peephole system having a narrow field of view.

In order to solve the problem described above, a three-dimensional hologram image display system using photorefractive crystal has been known as a system which supplement limitations of the resolution of the LCD (restrictions of the field of view).

A principle of such a three-dimensional hologram image display system will be briefly described below with reference to FIG. 2.

As shown in FIG. 2, the three-dimensional hologram image display system is configured with an interference fringe pattern computing apparatus 1, an interference fringe pattern recording apparatus 2*a*, reference wave irradiation apparatuses 3*a* and 3*b*, and an interference fringe pattern display apparatus 4.

The interference fringe pattern computing apparatus 1 is configured with a computer 11. As shown in FIG. 1, the interference fringe pattern computing apparatus 1 is configured to compute the interference fringe patterns (computer generated hologram) created from the object wave and the reference wave.

The interference fringe pattern display apparatus 4 is configured with an electronic display device (LCD 12 in an example of FIG. 2). The interference fringe pattern display apparatus 4 is configured to display an image of the interference fringe patterns computed by the interference fringe pattern computing apparatus 1.

Information for displaying such an image of the interference fringe patterns is transmitted from the interference fringe pattern computing apparatus 1 to the interference fringe pattern display apparatus 4 by an image signal.

The reference wave irradiation apparatus 3*a* is configured to irradiate a reference wave B1 toward the interference fringe pattern display apparatus 4 (LCD 12), and the reference wave irradiation apparatus 3*b* is configured to irradiate a reference wave B2 toward the interference fringe pattern recording apparatus 2*a* (hologram recording device 21).

Here, the reference wave B1 has the same wavelength and incidence angle as those of the reference wave for use in the computation of the interference fringe patterns by the interference fringe pattern computing apparatus 1.

When the reference wave B1 is irradiated toward the interference fringe pattern display apparatus 4, a direct beam and an object wave A1 are generated from the interference fringe pattern display apparatus 4. Here, the object wave A1 has a beam wavefront equivalent to that of the object wave for use in the computation of the interference fringe patterns by the interference fringe pattern computing apparatus 1. The object wave A1 propagates to the interference fringe pattern recording apparatus 2*a*.

The interference fringe pattern recording apparatus 2*a* is configured with the hologram recording device (light modulation device) 21. The interference fringe pattern recording apparatus 2*a* is configured to record an interference fringe patterns created from the object wave A1 and the reference wave B2 irradiated from the reference wave irradiation apparatus 3*a*, in the hologram recording device 21. Here, as the hologram recording device 21, the photorefractive crystal is used.

In a state where the interference fringe patterns are recorded in the hologram recording device 21 (photorefractive crystal) as described above, when the object wave A1 from the interference fringe pattern display apparatus 4 is blocked by a shutter or the like, and only the reference wave B2 is irradiated toward the interference fringe pattern recording apparatus 2*a*, an object wave A2 is generated by the interference fringe patterns recorded in the hologram recording device 21.

As a result, the observer can three-dimensionally observe the above-mentioned image of the three-dimensional shape by means of the object wave A2.

Such a three-dimensional hologram image display system using the photorefractive crystal as the hologram recording device 21 rerecords the interference fringe patterns created from the object wave A1 played back by the LCD and from the reference wave B2, thus making it possible to achieve an enlargement of the field of view.

However, the conventional three-dimensional hologram image display system using the photorefractive crystal is configured to record the interference fringe patterns in the interference fringe pattern recording apparatus 2*a* by use of an optical technique.

Accordingly, the conventional three-dimensional hologram image display system has had a problem in that the conventional three-dimensional hologram image display system is difficult to downsize.

BRIEF SUMMARY OF THE INVENTION

In viewing of the foregoing, it is an object of the present invention to provide a three-dimensional hologram image display system which realizes downsizing of apparatuses while realizing a wide field of view.

A first aspect of the present invention is summarized as a three-dimensional hologram image display apparatus which displays a three-dimensional hologram image by use of computed interference fringe patterns. The three-dimensional hologram image display apparatus includes a light modulation device which has an electro-optical effect in which a refractive index is varied in accordance with an applied electric field intensity; and an electric field controller configured to record computed interference fringe patterns in the light modulation device by varying an electric field intensity applied to the light modulation device in accordance with the computed interference fringe patterns.

In the first aspect, pixel electrodes corresponding to respective pixels of the interference fringe patterns can be provided on a surface of the light modulation device. And the electric field controller can be configured to vary the electric field intensity applied to the light modulation device by controlling voltages applied to the respective pixel electrodes.

In the first aspect, the electric field controller can be configured to store gray-scale values and voltage values of the interference fringe patterns in association with each other. And the electric field controller can be configured to apply voltages of the voltage values associated with the gray-scale values of the respective pixels in the interference fringe patterns, to the pixel electrodes corresponding to the respective pixels.

In the first aspect, the electric field controller can be configured to control the voltages applied to the respective pixel electrodes, in consideration of mutual functions of electric field intensities in adjacent pixels.

In the first aspect, the electric field controller can be configured to apply voltage only to a specific pixel electrode.

In the first aspect, the electric field controller can be configured not to apply voltages to pixel electrodes adjacent to a specific pixel electrode, when voltage applied to the specific pixel electrode is greater than or equal to a predetermined voltage.

A second aspect of the present invention is summarized as a three-dimensional hologram image display system, which includes a three-dimensional hologram image display apparatus and a server, and displays a three-dimensional hologram image. The server includes an interference fringe pattern computer configured to compute interference fringe patterns created from an object wave and a reference wave; a storage configured to store gray-scale values and voltage values of the interference fringe patterns in association with each other; and a transmitter configured to transmit the voltage values associated with the gray-scale values of respective pixels in computed interference fringe patterns to the three-dimensional hologram image display apparatus. The three-dimensional hologram image display apparatus includes a light modulation device which has pixel electrodes corresponding to the respective pixels of the interference fringe patterns provided on a surface thereof, and has an electro-optical effect in which a refractive index is varied in accordance with an applied electric field intensity; and an electric field controller configured to record the interference fringe patterns in the light modulation device by applying, to pixel electrodes corresponding to the respective pixels, voltages of the voltage values associated with the gray-scale values of the respective pixels in the interference fringe patterns received from the server.

DETAILED DESCRIPTION OF THE INVENTION

<A Configuration of a Three-Dimensional Hologram Image Display System According to a First Embodiment of the Present Invention>

Figure 1:
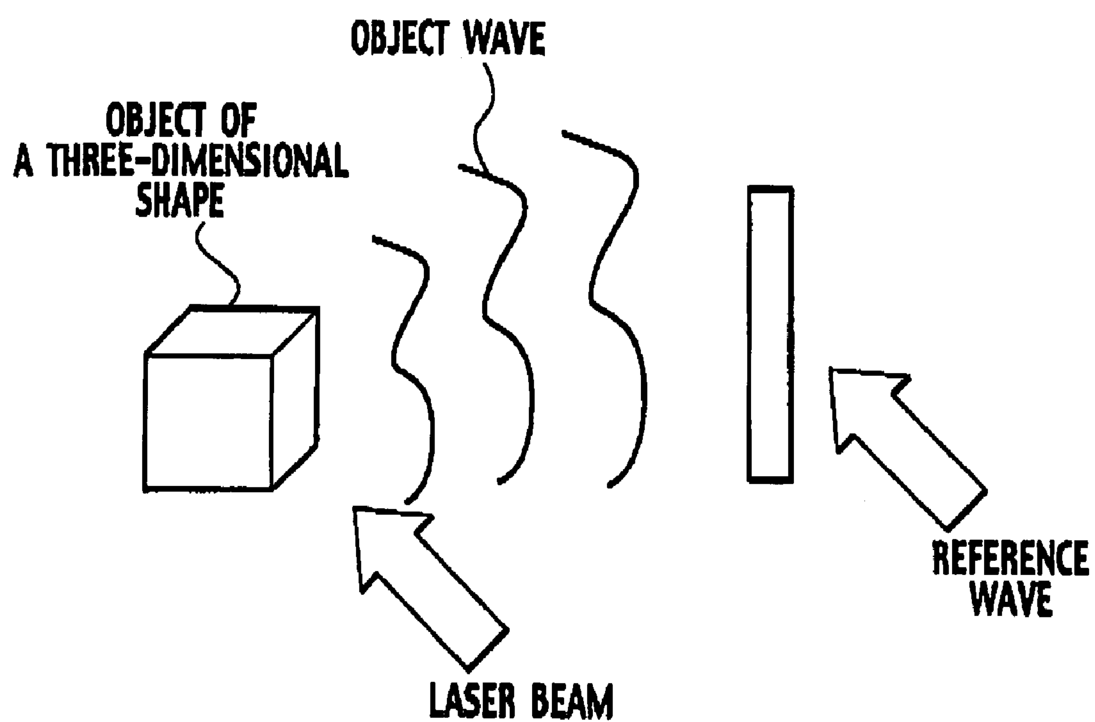
FIG. 1 is a view for explaining a state of obtaining a computer generated hologram in a three-dimensional hologram image display apparatus according to a prior art.
Figure 2:
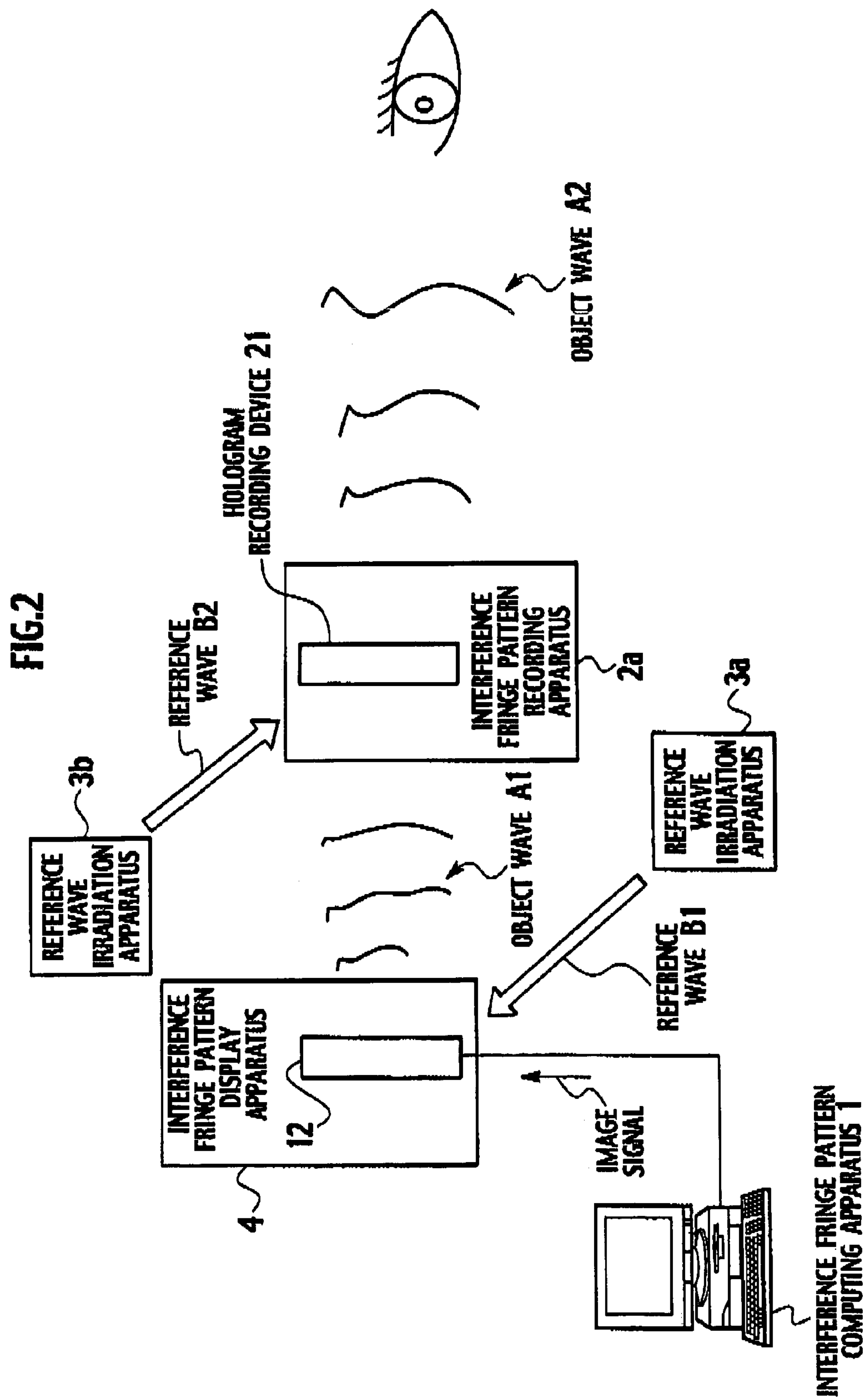
FIG. 2 is an entire configuration view of a three-dimensional hologram image display system according to the prior art.
Figure 3:
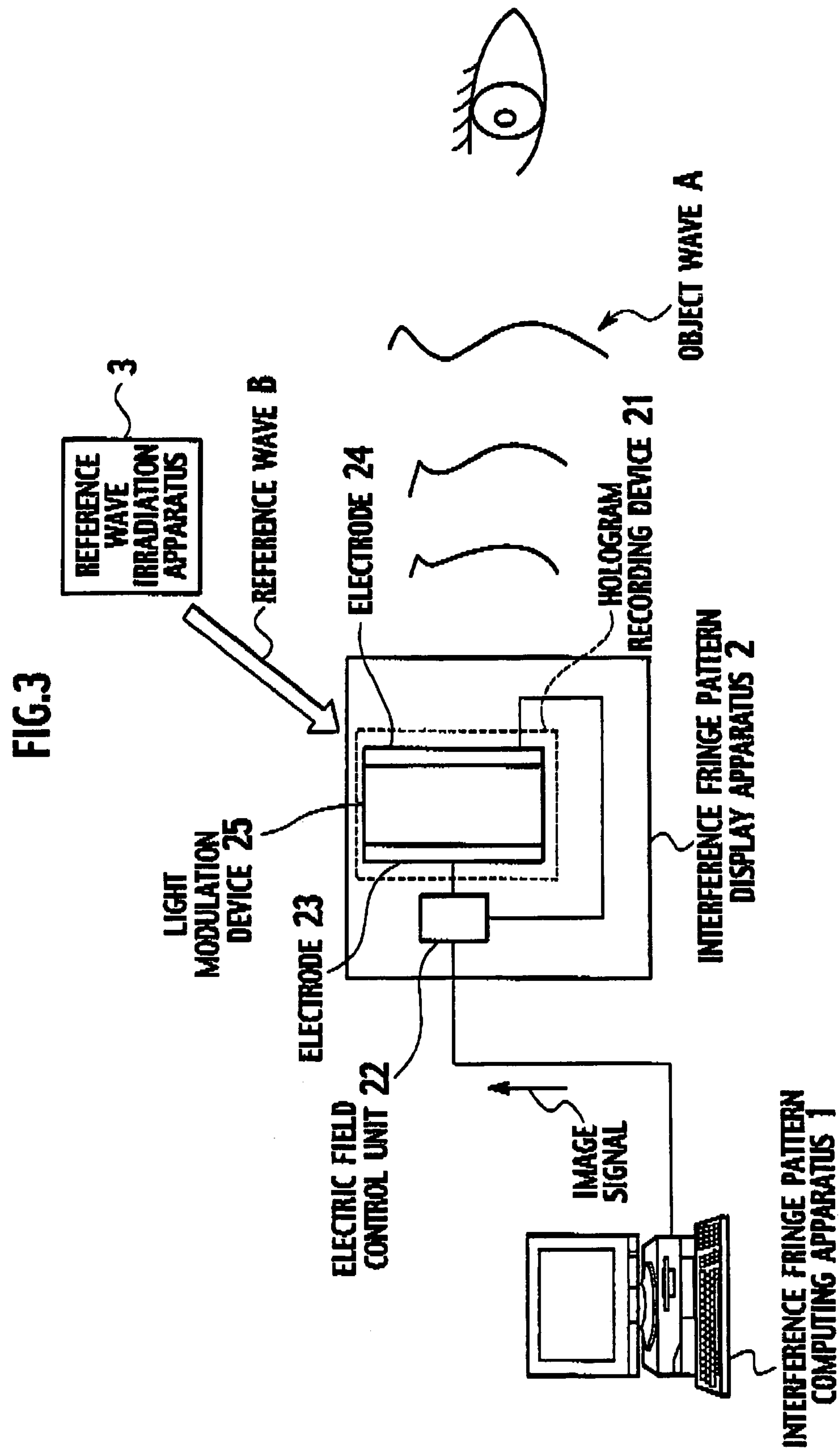
FIG. 3 is an entire configuration view of a three-dimensional hologram image display system according to a first embodiment of the present invention.

FIG. 3 is a view showing an entire configuration of a three-dimensional hologram image display system in a first embodiment of the present invention.

The three-dimensional hologram image display system according to the first embodiment is a three-dimensional hologram image display system which displays a three-dimensional hologram image by use of a computer generated hologram.

As shown in FIG. 3, the three-dimensional hologram image display system according to the first embodiment is configured with an interference fringe pattern computing apparatus 1, a three-dimensional hologram image display apparatus 2, and a reference wave irradiation apparatus 3.

Here, in this specification, a concept of an "image" includes a still-frame picture, a moving picture (video).

Similarly to the interference fringe pattern computing apparatus 1 according to the prior art, the interference fringe pattern computing apparatus 1 is configured with a computer.

The interference fringe pattern computing apparatus 1 is configured to compute interference fringe patterns created from an object wave and a reference wave. The object wave is created in a manner that a laser beam irradiated onto an object of a three-dimensional shape (for example, 3D data of a cube) is reflected thereon.

Note that the interference fringe patterns are gray-scale images in which variations of brightness correspond to amplitude information of light and a fringe pattern corresponds to phase information of the light.

The three-dimensional hologram image display apparatus 2 includes a light modulation device 25 in which a refractive index is varied in accordance with an electric field intensity.

The three-dimensional hologram image display apparatus 2 is configured to record the interference fringe patterns in the light modulation device 25, by varying the electric field intensity applied to the light modulation device 25 in accordance with the interference fringe patterns.

As shown in FIG. 3, the three-dimensional hologram image display apparatus 2 is configured with a hologram recording device 21 and an electric field control unit 22.

The hologram recording device 21 adopts a configuration in which electrodes 23 corresponding to the respective pixels of the interference fringe patterns are provided on a surface of the light modulation device 25 having the refractive index varied in accordance with an applied electric field intensity.

That is to say, the hologram recording device 21 adopts a configuration in which the light modulation device 25 is sandwiched between microelectrodes 23 and 24.

Figure 4A:
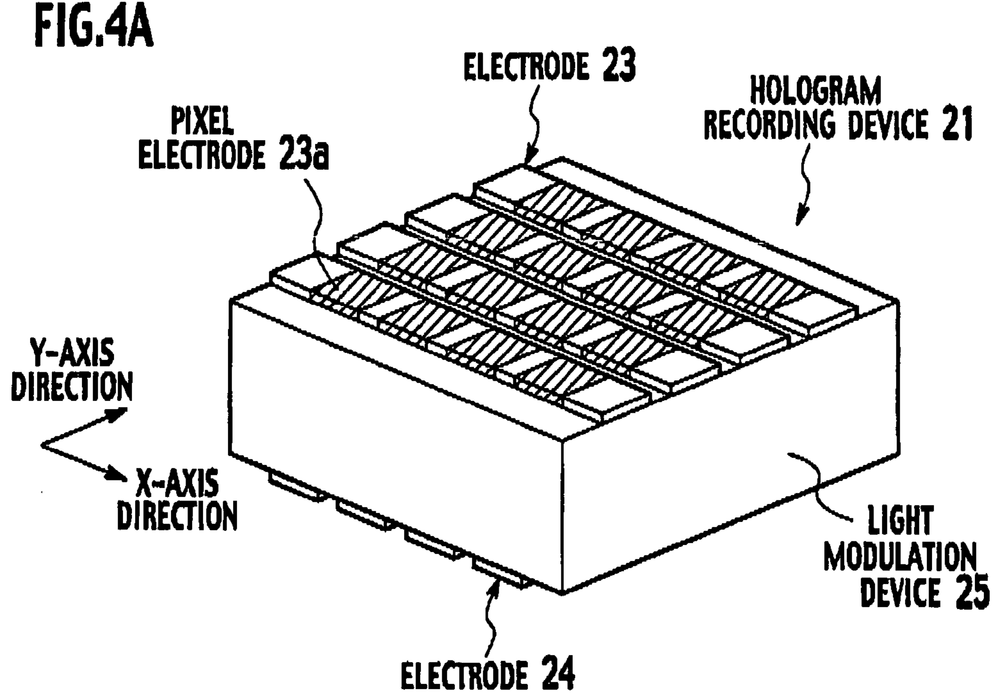
FIGS. 4A and 4B are exterior views of a hologram recording device of a three-dimensional hologram image display apparatus according to the first embodiment of the present invention.
Figure 4B:
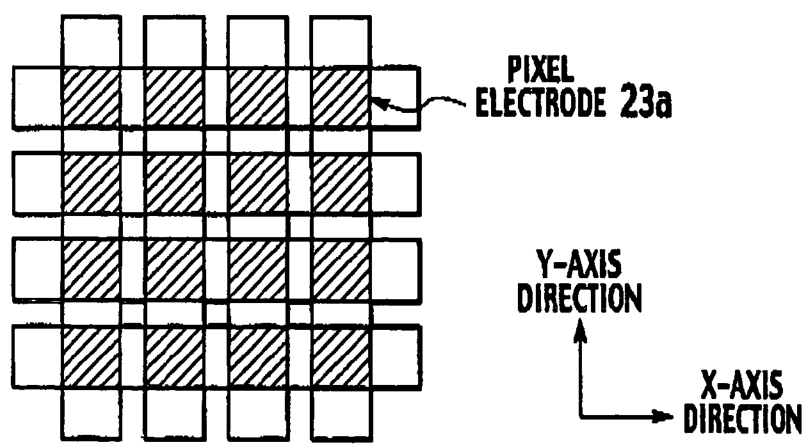

For example, as shown in FIGS. 4A and 4B, the hologram recording device 21 may have an electrode structure of a simple matrix system.

In such a case, the hologram recording device 21 adopts a configuration in which the electrodes 23 in an X-axis direction are pasted on an upper surface of the light modulation device 25 formed as a thin film, and the electrodes 24 in a Y-axis direction are pasted on a lower surface of the light modulation device 25 formed as the thin film.

Here, intersection portions of the electrodes 23 in the X-axis direction and the electrodes 24 in the Y-axis direction apply to pixel electrodes 23*a* corresponding to the respective pixels.

Figure 5A:
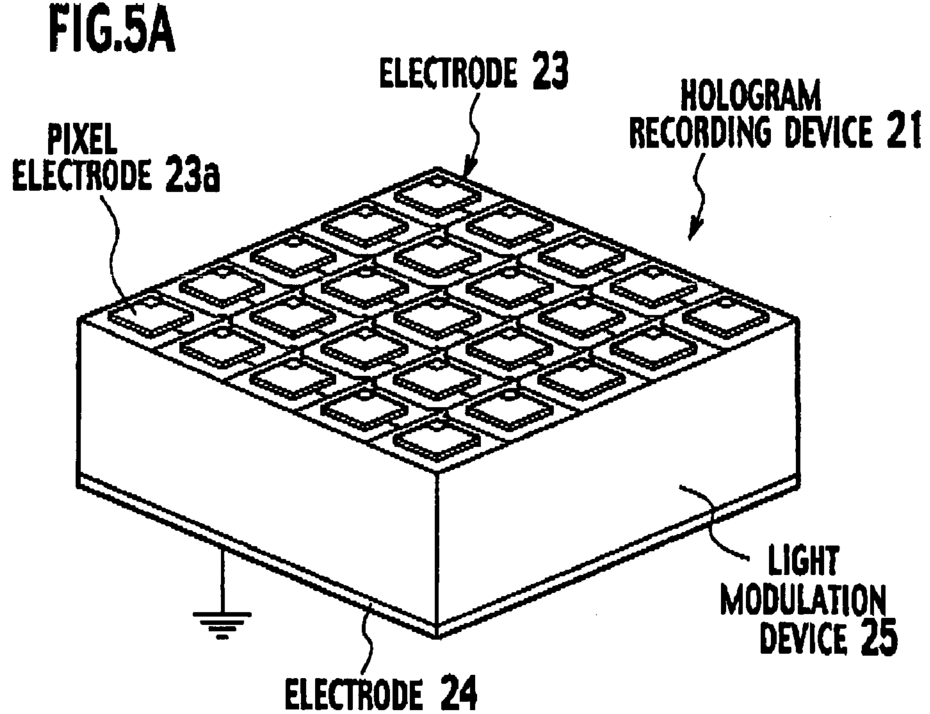
FIGS. 5A and 5B are exterior views of a hologram recording device of the three-dimensional hologram image display apparatus according to the first embodiment of the present invention.
Figure 5B:
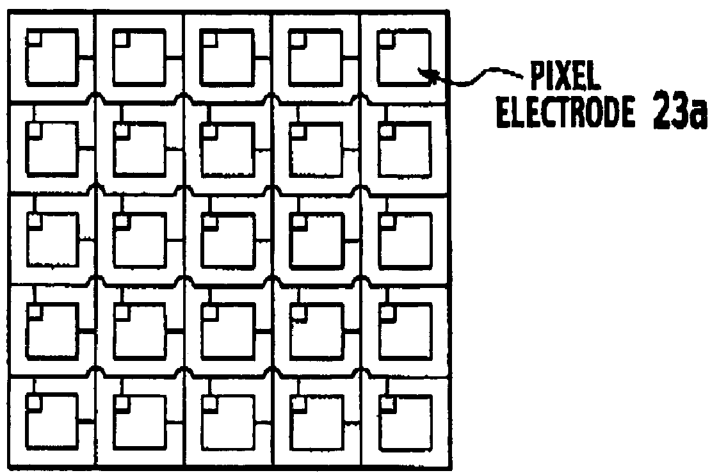

Moreover, as shown in FIGS. 5A and 5B, the hologram recording device 21 may have an electrode structure of an active matrix system.

In such a case, the hologram recording device 21 adopts a configuration in which transistors capable of independently controlling ON/OFF of each of the pixel electrodes 23*a* corresponding to the respective pixels are prepared.

Here, as the light modulation device 25, used is a material such as PLZT, SBT and SBN which are ferroelectric materials capable of easily realizing refractive-index modulation by electric-field control by use of polarization inversion.

The electric field control unit 22 is configured to vary the refractive index inside of the light modulation device 25, by varying the electric field intensity applied to the light modulation device 25, based on information for displaying the interference fringe patterns (gray-scale values of the respective pixels of the interference fringe patterns). The information is transmitted from the interference fringe pattern computing apparatus 1 by an image signal.

Here, a state where the electric field control unit 22 controls the electric field intensity applied to the light modulation device 25 will be specifically described with reference to FIGS. 6A and 6B.

Figures 6A, 6B:
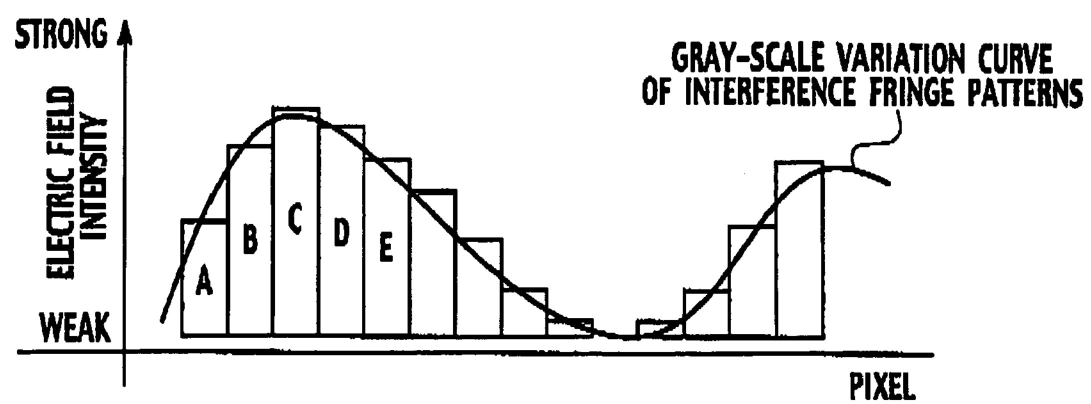
FIGS. 6A and 6B are views for explaining control for an electric field intensity by a electric field control unit of the three-dimensional hologram image display apparatus according to the first embodiment of the present invention.

FIG. 6A shows apart of the pixels (A, B, C . . . ) constituting the interference fringe patterns computed by the interference fringe pattern computing apparatus 1.

When the gray-scale values at positions corresponding to the respective pixels (A, B, C . . . ) of the interference fringe patterns are varied as in "a gray-scale variation curve of the interference fringe patterns" shown in FIG. 6B, the electric filed control unit 22 applies voltages (A, B, C . . . ) shown in a bar graph of FIG. 6B to the respective pixel electrodes 23*a* corresponding to the respective pixels (A, B, C . . . ) of the interference fringe patterns.

Here, it is assumed that the electric field control unit 22 can control the voltages applied to the respective pixel electrodes 23*a* completely independently.

Specifically, as in the pattern of the interference fringe patterns computed by the interference fringe pattern computing apparatus 1, the electric field control unit 22 is configured to locally vary the refractive index inside of the light modulation device 25, by locally varying the electric field intensity applied to the light modulation device 25, so as to record the interference fringe patterns concerned in the light modulation device 25.

Note that the refractive index is constant in a state where an electric field intensity is not varied inside of the light modulation device 25.

Figures 7A, 7B:
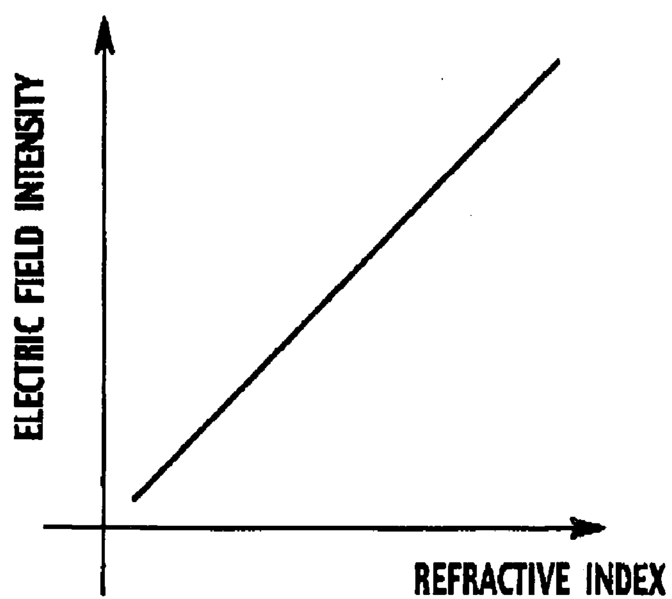
FIGS. 7A and 7B are views for explaining control for an electric field intensity by a electric field control unit of the three-dimensional hologram image display apparatus according to the first embodiment of the present invention.

Moreover, as shown in FIG. 7A, the electric field control unit 22 is configured to store the gray-scale values and voltage values of the interference fringe patterns in association with each other.

And the electric field control unit 22 may be configured to apply voltages of the voltage values associated with the gray-scale values of the respective pixels in the interference fringe patterns, to the pixel electrodes 23*a* corresponding to the respective pixels.

In such a case, the electric field control unit 22 computes and stores a relationship between the gray-scale values and voltage values of the interference fringe patterns for each material of the light modulation device 25 based on a relationship shown in FIG. 7B, which is between an applied electric field intensity and the refractive index inside of the light modulation device, a relationship between the gray-scale values of the interference fringe patterns and the refractive index inside of the light modulation device, and the like.

In general, the relationship between an applied electric field intensity and the refractive index can be represented as follows.

In general, a displacement An of the refractive index is represented as:

$$\Delta n \propto r \cdot n_0^3 \cdot V/d$$

where "$n_0$" is the refractive index when no electric field is applied (when "V=0"), "V" is the voltage value, "d" is a distance between the electrodes, and "r" is an electro-optical coefficient.

The reference wave irradiation apparatus 3 is configured to irradiate a reference wave B toward the light modulation device 25.

Here, the reference wave B has the same wavelength and incidence angle as those of the reference wave for use in the computation of the interference fringe patterns by the interference fringe pattern computing apparatus 1.

When the reference wave B is irradiated toward the light modulation device 25 in a state where the interference fringe patterns are recorded in the light modulation device 25 as described above, an object wave A is generated by the interference fringe patterns recorded in the light modulation device 25.

As a result, the same object wave A as light coming from the object of the three-dimensional shape for use in the computation of the interference fringe patterns by the interference fringe pattern computing apparatus 1 is made incident onto eyes of an observer, and thus the observer can three-dimensionally observe the above-described object of the three-dimensional shape.

Specifically, the three-dimensional hologram image display apparatus 2 according to the first embodiment is different from the three-dimensional hologram image display apparatus according to the prior art in that the variations of the refractive index of the hologram recording device 21 are controlled by the variations of the electric field intensity, that the recording of the interference fringe patterns in the hologram recording device 21 is realized not optically but electrically, and that the variations of the electric field intensity are realized by use of the polarization inversion.

In the first embodiment described above, the interference fringe pattern computing apparatus 1 and the three-dimensional hologram image display apparatus 2 are provided as apparatuses separate from each other.

However, the present invention is not limited to this configuration, and is also applicable to a configuration in which the three-dimensional hologram image display apparatus 2 includes a function of the interference fringe pattern computing apparatus 1.

<Operation of the Three-Dimensional Hologram Image Display System According to the First Embodiment of the Present Invention)

Figure 8:
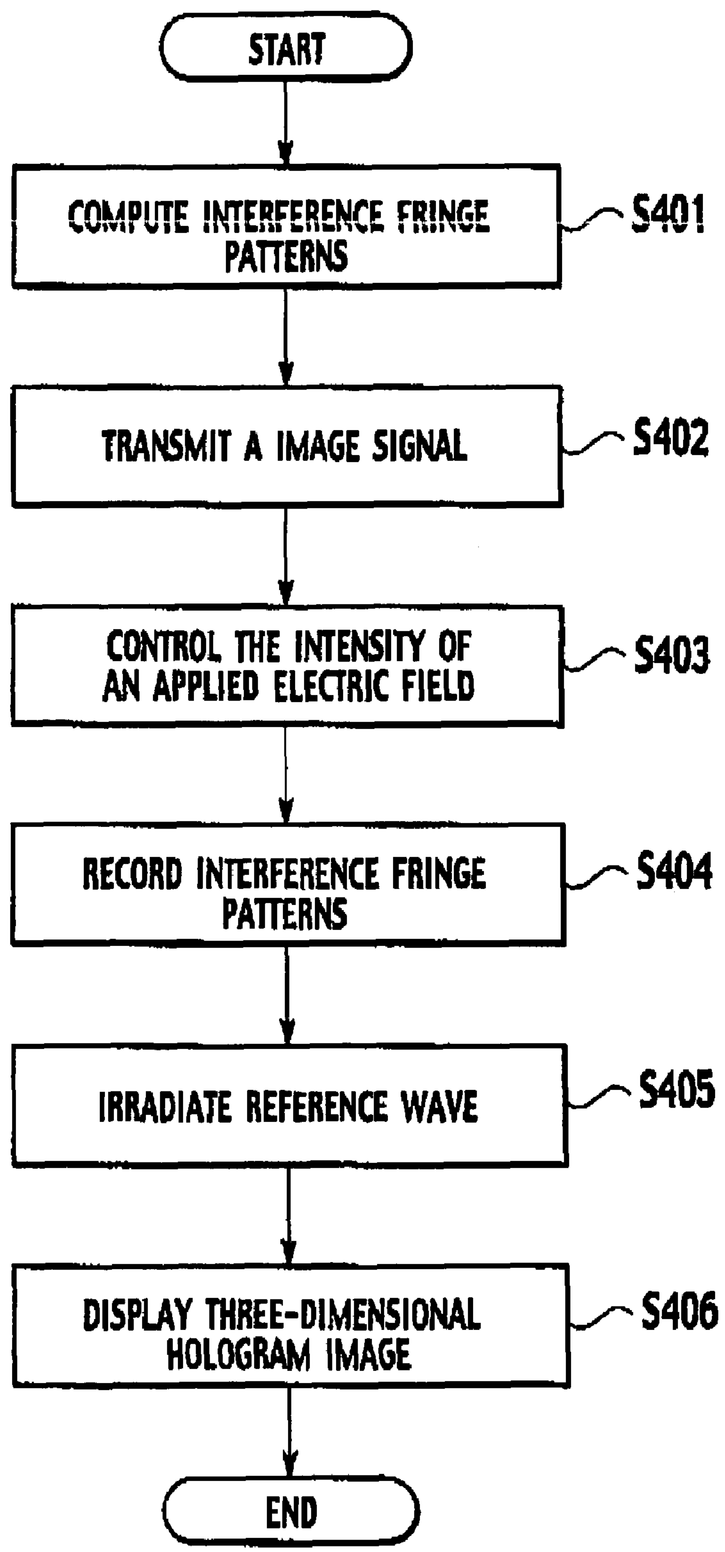
FIG. 8 is a flowchart showing an operation of the three-dimensional hologram image display system according to the first embodiment of the present invention.

An operation of the three-dimensional hologram image display system according to the first embodiment of the present invention will be described with reference to FIG. 8.

In Step 401, the interference fringe pattern computing apparatus 1 computes the interference fringe patterns created from the object wave and the reference wave. The object wave is created in the manner that the laser beam irradiated onto the object of the three-dimensional shape is reflected thereon.

Figure 9:
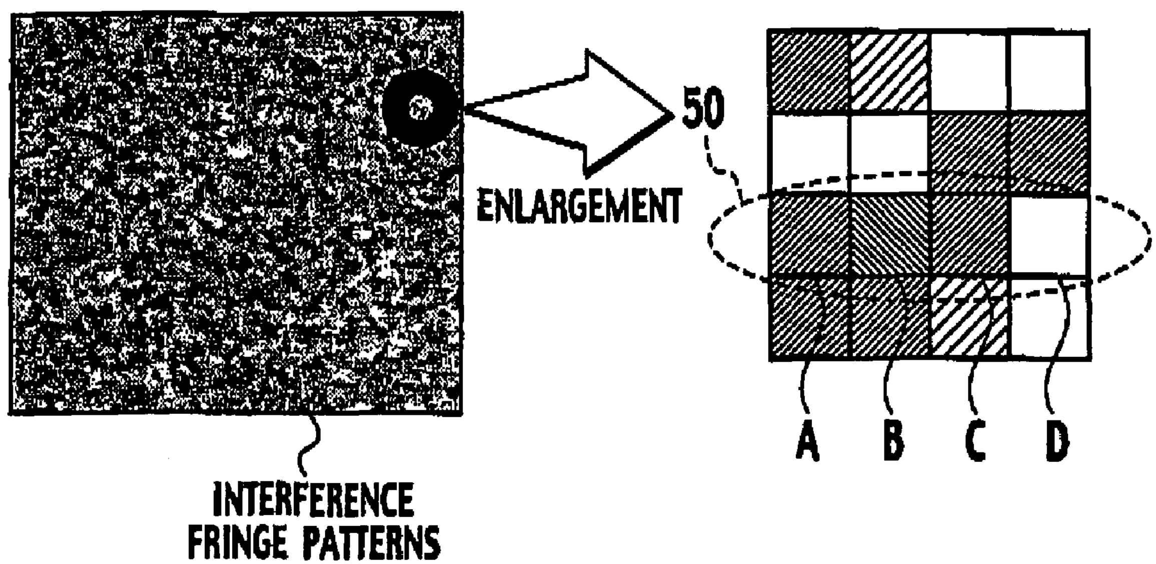
FIG. 9 is a view showing image information of interference fringe patterns computed by an interference fringe pattern computing apparatus of the three-dimensional hologram image display system according to the first embodiment of the present invention, and showing image information of an enlarged local region of the interference fringe patterns.

FIG. 9 shows a state where the interference fringe patterns are displayed and a state where a local region of the displayed interference fringe patterns is enlarged. Each of squares "A" to "D" indicates one pixel constituting the interference fringe patterns.

In Step 402, the interference fringe pattern computing apparatus 1 transmits the information for displaying the above-described interference fringe patterns, to the three-dimensional hologram image display apparatus 2 by the image signal.

In Step 403, as in a conventional liquid crystal display device and the like, the electric field control unit 22 of the three-dimensional hologram image display apparatus 2 controls the electric fields intensities applied to the respective pixel electrodes 23*a* corresponding to the respective pixels constituting the interference fringe patterns based on the gray-scale values of the respective pixels.

Figure 10:
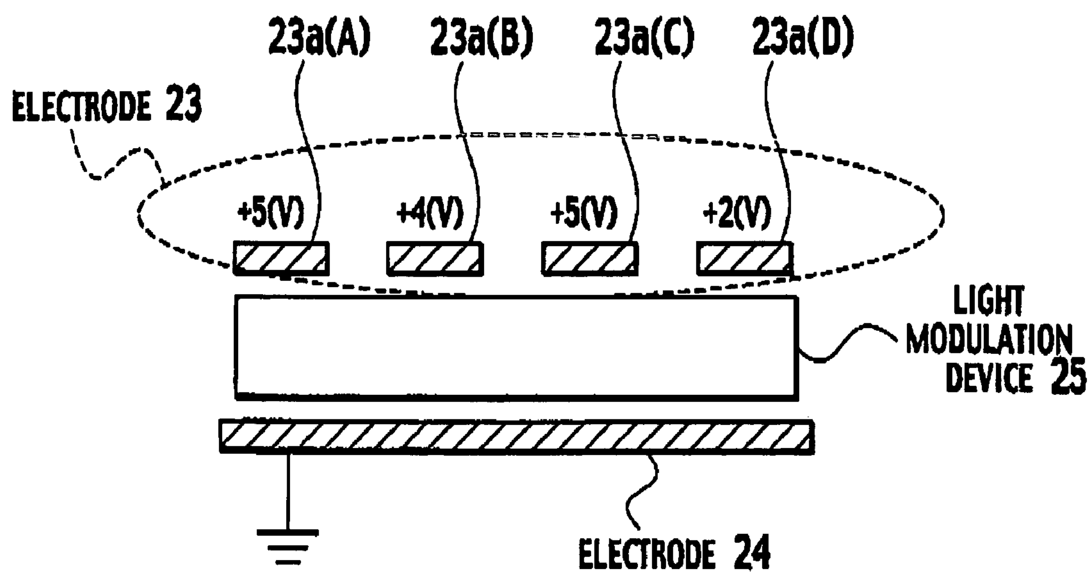
FIG. 10 is a cross-sectional view of the hologram recording device of the three-dimensional hologram image display apparatus according to the first embodiment of the present invention.

FIG. 10 shows a cross-sectional view of the hologram recording device 21 of the three-dimensional hologram image display apparatus 2.

Here, it is assumed that pixel electrodes 23*a* (A) to 23*a* (D) correspond to the pixels "A" to "D", respectively. Moreover, it is assumed that a relationship between the refractive index and the electric field intensity inside of the light modulation device 25 is the relationship shown in FIG. 7B.

For example, when gray-scale values of the pixels "A" to "D" are "255", "200", "255" and "100", respectively, the electric field control unit 22 varies voltages applied to the pixel electrodes 23*a* (A) to 23*a* (D) to "+5V", "+4V", "+5V" and "+2V".

As described above, the electric field control unit 22 applies the different voltages to the respective pixel electrodes 23*a* (A) to 23*a* (D) of the hologram recording device 21.

Thus, in Step S404, in the light modulation device 25, refractive-index modulations corresponding to the interference fringe patterns computed by the interference fringe pattern computing apparatus 1 are realized, and the interference fringe patterns concerned are recorded.

Figure 11:
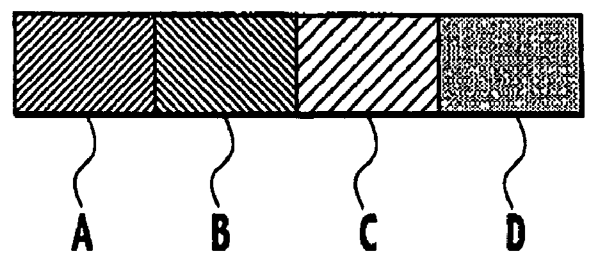
FIG. 11 is a view showing pixels constituting the local region of the interference fringe patterns recorded in a light modulation device of the three-dimensional hologram image display apparatus according to the first embodiment of the present invention.

FIG. 11 shows pixels "A" to "D" constituting the local region of the interference fringe patterns recorded in the light modulation device 25.

In FIG. 11, for facilitating the understanding, refractive indices corresponding to the respective pixels "A" to "D" are shown by variations of shades of gray.

In Step 405, onto the light modulation device 25, the reference wave irradiation apparatus 3 irradiates the reference wave B having the same wavelength and incidence angle as those of the reference wave for use in the computation of the interference fringe patterns by the interference fringe pattern computing apparatus 1.

In Step 406, when the reference wave B is irradiated toward the light modulation device 25 in the state where the interference fringe patterns are recorded in the light modulation device 25, the object wave A is generated by the interference fringe patterns recorded in the light modulation device 25.

As a result, the same object wave A as the light coming from the object of the three-dimensional shape for use in the computation of the interference fringe patterns by the interference fringe pattern computing apparatus 1 is made incident onto the eyes of the observer, and thus the observer can three-dimensionally observe the above-described object of the three-dimensional shape.

(Function/Effect of Three-Dimensional Hologram Image Display System According to First Embodiment of the Present Invention)

According to the three-dimensional hologram image display system in accordance with the first embodiment of the present invention, the recording of the interference fringe patterns in the hologram recording device 25 can be controlled electrically. Accordingly, downsizing of the three-dimensional hologram image display system can be realized while realizing a three-dimensional hologram image display enabling a wide angle of view.

Specifically, according to the three-dimensional hologram image display system in accordance with the first embodiment of the present invention, it is not necessary, as the conventional three-dimensional hologram image display system, to adopt a two-stage configuration in which the interference fringe patterns are displayed by the interference fringe pattern display apparatus 4 such as the LCD 12 and the interference fringe patterns created from the object wave A1 generated from the displayed interference fringe patterns and from the reference wave B2 is written into the hologram recording device.

Accordingly, the downsizing of the three-dimensional hologram image display system can be realized.

(Configuration of Three-Dimensional Hologram Image Display System According to a Second Embodiment of the Present Invention)

A three-dimensional hologram image display system according to a second embodiment of the present invention will be described with reference to FIGS. 12A and 12B, Different points of the three-dimensional hologram image display system according to the second embodiment from the above-described three-dimensional hologram image display system according to the first embodiment will be mainly described below.

For example, in such usual image information as an image of a checker flag, there is a possibility that gray-scale values of adjacent pixels are radically varied. For this reason, an image display device which displays such pixel information must control all of the pixels completely independently.

However, because the interference fringe patterns are formed by synthesizing light waves, in the interference fringe patterns, the gray-scale values of the adjacent pixels are not radically varied as in the above-described image of the checker flag from a micro-level viewpoint.

For this reason, in the case of the information for displaying the interference fringe patterns, even if all of the pixels are not controlled completely independently, the interference fringe patterns to be played back are affected little in terms of deterioration.

Therefore, the electric field control unit 22 which plays back the interference fringe patterns can be configured to control the voltages applied to the respective pixel electrodes 23*a* (A) to 23*a* (D), in consideration of mutual functions of the electric field intensities applied to the adjacent pixel electrodes 23*a* (A) to 23*a* (D).

Specifically, it is not necessary for the electric field control unit 22 to control the pixel electrodes 23*a* corresponding to all of the pixels for each pair of the adjacent pixels completely independently.

And it is satisfactory if a trend of the variations of the gray-scale values in the neighboring pixels is controlled so as to be the same as a trend of the variations of the gray-scale values of the original interference fringe patterns.

A state where the electric field intensity applied to the light modulation device 25 is controlled when the electric field control unit 22 cannot control the pixel electrodes corresponding to all of the pixels completely independently, that is, when electric fields applied to the adjacent pixel electrodes affect one another will be specifically described with reference to FIGS. 12A and 12B.

Figure 12A:
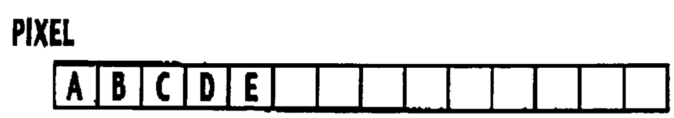
FIGS. 12A and 12B are views for explaining control for an electric field intensity by a electric field control unit of the three-dimensional hologram image display apparatus according to a second embodiment of the present invention.

Here, FIG. 12A shows a part of the pixels (A, B, C . . . ) constituting the interference fringe patterns computed by the interference fringe pattern computing apparatus 1.

Note that, in FIG. 12A, pixel electrodes adjacent to the pixel electrode 23*a* (C) corresponding to the pixel "C" may be only the pixel electrodes 23*a* (B) and 23*a* (D) corresponding to the pixels "B" and "D", or may include the pixel electrodes 23*a* (A) and 23*a* (E) corresponding to the pixels "A" and "E".

Figure 12B:
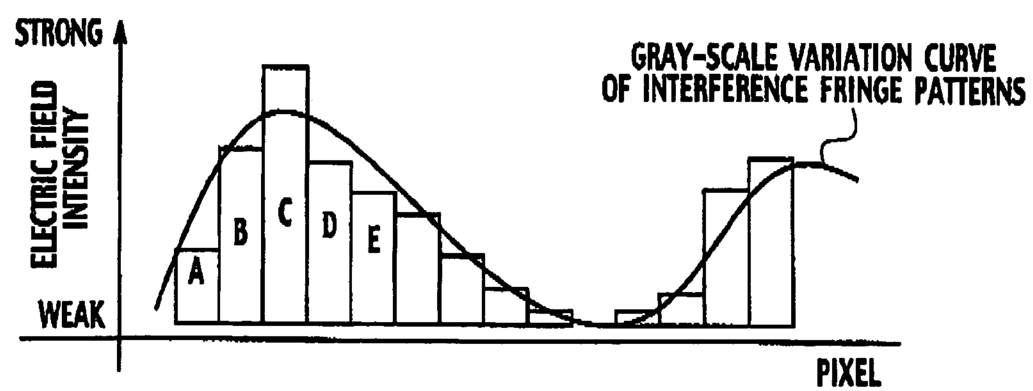

For example, as shown in FIG. 12B, in consideration of the mutual functions of the electric field intensities in the adjacent pixel electrodes, the electric field control unit 22 lessens the voltages applied to the pixel electrodes 23*a* (A) and 23*a* (B) corresponding to the pixels "A" and "B" than true values, and increases the voltage applied to the pixel electrode 23*a* (C) corresponding to the pixel "C" more than a true value.

Note that the true values refer to the voltages applied to the respective pixel electrodes, when the electric field control unit 22 can control the pixel electrodes corresponding to all of the pixels completely independently (refer to FIG. 6B).

As a result, though the gray-scale values of the respective pixels "A" to "C" are different from those in the case of FIG. 6B, "a gray-scale variation curve of the interference fringe patterns" formed of the gray-scale values of the three pixels "A" to "C" becomes substantially the same as "the gray-scale variation curve of the interference fringe patterns" shown in FIG. 6B.

Moreover, the electric field control unit 22 can also thin out the pixel electrodes to which the voltages are applied in such a manner that the voltage applied to the pixel electrode corresponding to the pixel "C" is increased more than the true value and the voltages are not applied to the pixels "A", "B", "D", "E" and the like, which are adjacent to the pixel "C".

Specifically, the electric field control unit 22 does not have to control the voltages applied to the pixel electrodes corresponding to all of the pixels.

And the electric field control unit 22 can be configured to control only voltages applied to pixel electrodes corresponding to specific pixels.

Here, determination methods of the pixel electrodes for which it is necessary to control the voltages differ depending on characteristics of the light modulation device 25.

By performing the processing as described above, from a global viewpoint, the electric field control unit 22 can obtain a similar result to that of "the gray-scale variation curve of the interference fringe patterns" shown in FIG. 6B, even if the electric field control unit 22 cannot control the pixel electrodes corresponding to all of the pixels completely independently, that is, even if the electric fields in the adjacent pixel electrodes affect one another.

Moreover, the electric field control unit 22 may also be configured not to apply the voltages to the pixel electrodes (for example, the pixels "A", "B", "D" and "E") adjacent to the specific pixel electrode (for example, the pixel electrode corresponding to the pixel "C") when the voltage applied to the specific electrode is a predetermined voltage or more.

According to the three-dimensional hologram image display system in accordance with the second embodiment, a restriction condition that the adjacent electrodes must be controlled completely independently is relaxed, and accordingly, manufacture of the system becomes facilitated.

<Configuration of Three-Dimensional Hologram Image Display System According to a Third Embodiment of the Present Invention>

A three-dimensional hologram image display system according to a third embodiment of the present invention will be described with reference to FIGS. 13 to 15.

Different points of the three-dimensional hologram image display system according to the third embodiment from the above-mentioned three-dimensional hologram image display system according to the first embodiment will be mainly described below.

Figure 13:
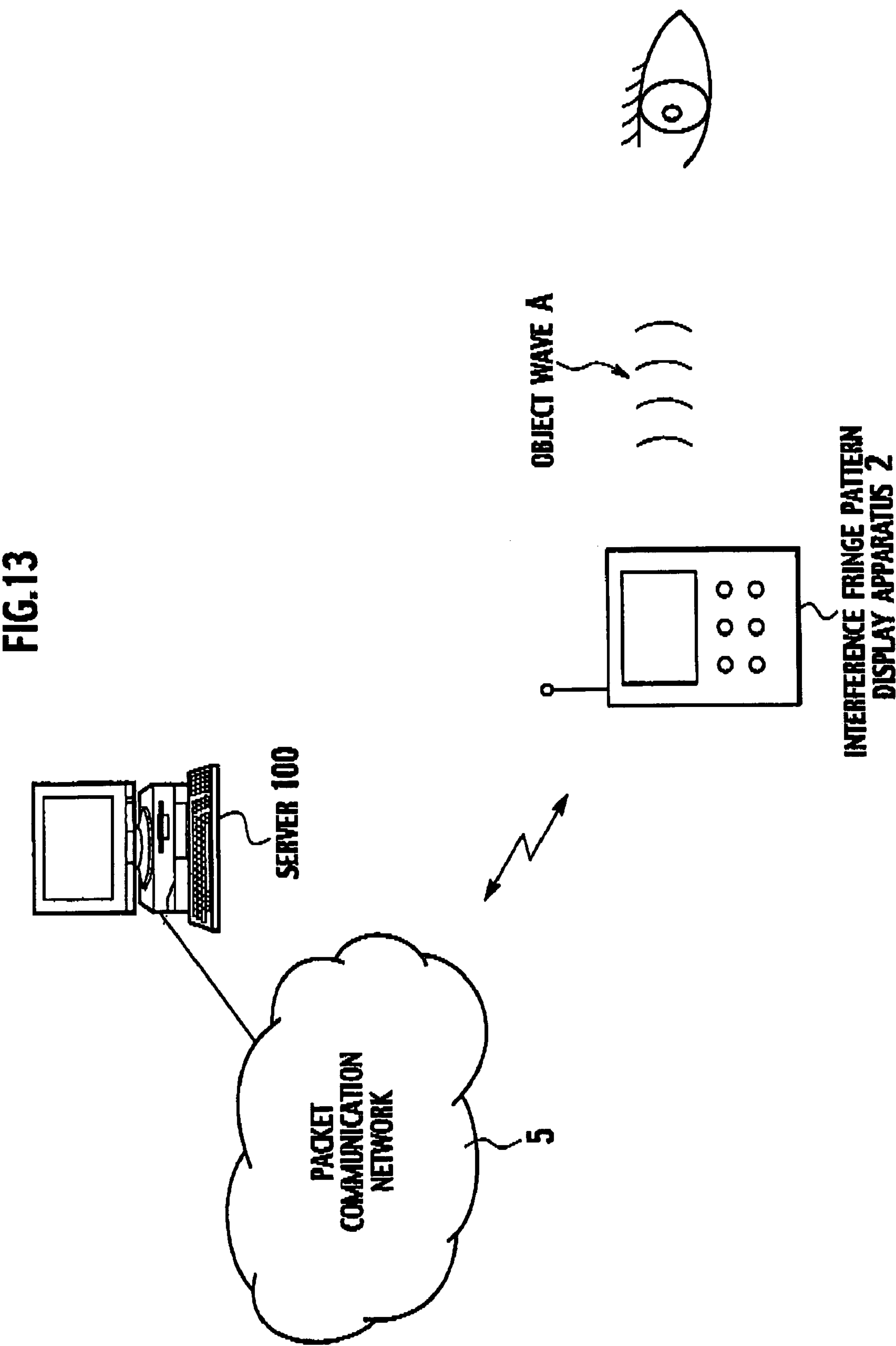
FIG. 13 is an entire configuration view of a three-dimensional hologram image display system according to a third embodiment of the present invention.

As shown in FIG. 13, the three-dimensional hologram image display system according to the third embodiment includes a server 100, and a three-dimensional hologram image display apparatus 2.

In this embodiment, an example where the three-dimensional hologram image display apparatus 2 is configured with a mobile communication terminal communicable with the server 100 through a packet communication network 5 will be described.

Figure 14:
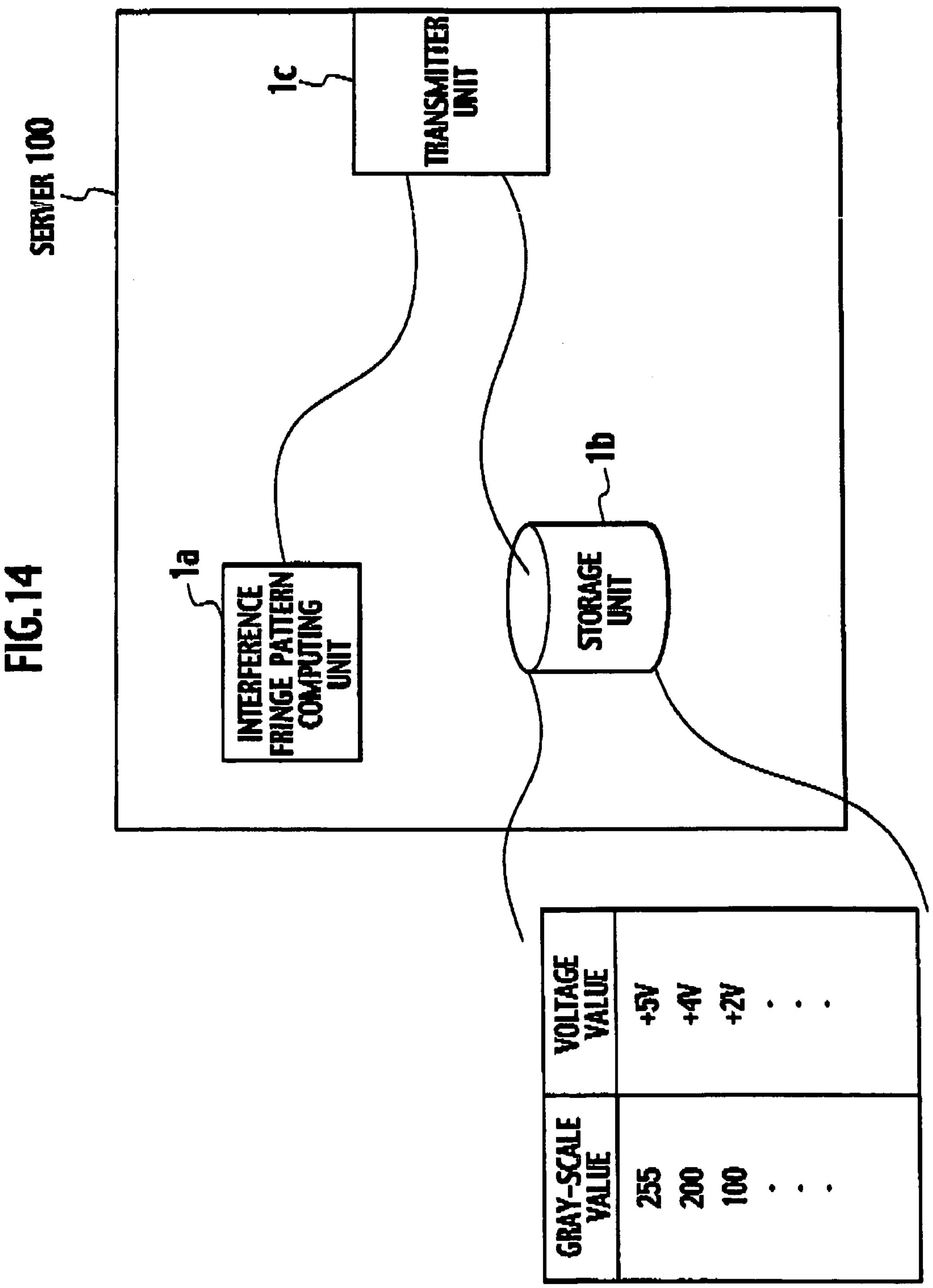
FIG. 14 is a functional block diagram of a server of the three-dimensional hologram image display system according to the third embodiment of the present invention.

As shown in FIG. 14, the server 100 includes an interference fringe pattern computing unit 1*a*, a storage unit 1*b*, and a transmitter unit 1*c*.

The interference fringe pattern computing unit 1*a* is configured to compute interference fringe patterns (computer generated hologram) created from an object wave and a reference wave.

The storage unit 1*b* is configured to store gray-scale values and voltage values of the interference fringe patterns in association with each other.

The transmitter unit 1*c* is configured to transmit voltage values associated with the gray-scale values of the respective pixels of the computed interference fringe patterns, to the three-dimensional hologram image display apparatus 2.

Figure 15:
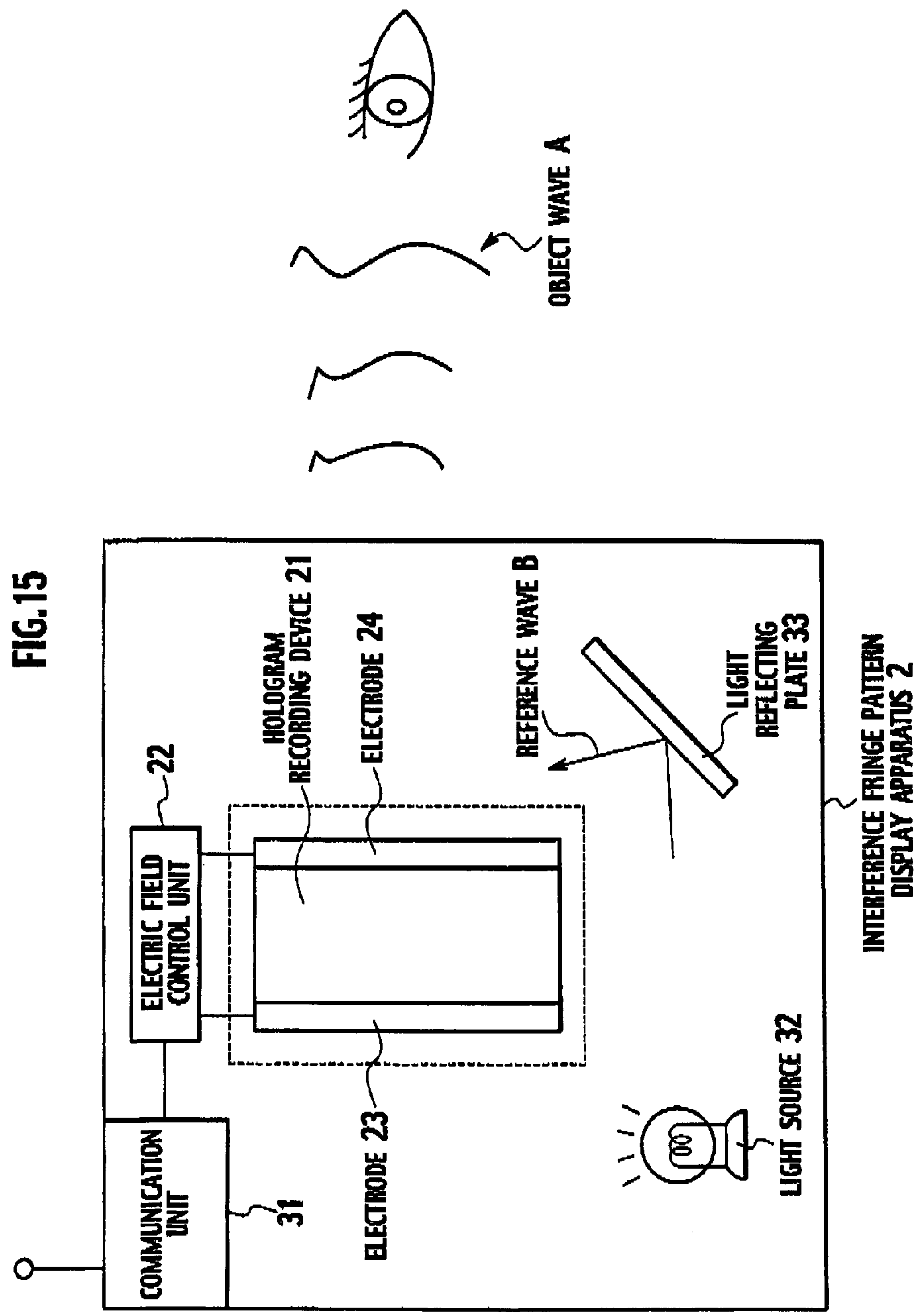
FIG. 15 is a functional block diagram of a three-dimensional hologram image display apparatus of the three-dimensional hologram image display system according to the third embodiment of the present invention.

As shown in FIG. 15, the three-dimensional hologram image display apparatus 2 includes a communication unit 31, a hologram recording device 21, an electric field control unit 22, a light source 32, and a light reflecting plate 33.

The communication unit 31 is configured to require the server 100 to transmit the voltage values corresponding to the gray-scale values of the respective pixels of the interference fringe patterns for displaying a three-dimensional hologram image, and to transmit the received voltage values to the electric field control unit 22.

The electric field control unit 22 is configured to record the interference fringe patterns in the light modulation device 25 as the hologram recording device 21, by applying, to the pixel electrodes corresponding to the respective pixels, the voltages of the voltage values associated with the gray-scale values of the respective pixels of the interference fringe patterns. Here, the gray-scale values of the respective pixels of the interference fringe patterns are received from the server 100 through the communication unit 31.

Note that a configuration of the hologram recording device 21 is similar to the configuration of the hologram recording device 21 according to the above-mentioned first embodiment.

The light reflecting plate 33 is configured to create a reference wave B, by reflecting light from the light source 32.

Here, the reference wave B has the same wavelength and incidence angle as those of the reference wave for use in the computation of the interference fringe patterns by the interference fringe pattern computing unit 1*a* of the server 100.

Note that the light source 32 may be a backlight for use in a liquid crystal display of the mobile communication terminal, or may be a light source provided separately from such a backlight.

Note that, though a configuration in which the server 100 transmits the voltage values associated with the gray-scale values of the interference fringe patterns to the three-dimensional hologram image display apparatus 2 through the packet communication network 5 has been described in the above-described third embodiment, the present invention is also applicable to a configuration in which the server 100 transmits the gray-scale values of the interference fringe patterns to the three-dimensional hologram image display apparatus 2 through the packet communication network 5.

As described above, according to the present invention, the three-dimensional hologram image display apparatus and the three-dimensional hologram image display system, which realize the downsizing thereof while realizing the three-dimensional hologram image display enabling the wide angle of view, can be provided.

Additional advantages and modifications will readily occur to those skilled in the art. Therefore, the invention in its broader aspects is not limited to the specific details and the representative embodiment shown and described herein. Accordingly, various modifications may be made without departing from the scope of the general inventive concept as defined by the appended claims and their equivalents.

What is claimed is:

1. An interference fringe pattern recording apparatus which records an interference fringe pattern to display a three-dimensional hologram image by a reference wave irradiation, the apparatus comprising:

a light modulation device in which a refractive index of each of a plurality of pixels is varied based on an electric field intensity of each of the plurality of pixels;

a plurality of pixel electrodes provided on a surface of the light modulation device, and provided for each of the plurality of pixels;

an electric field controller configured to configured to control a voltage to be applied to each of the plurality of the pixel electrodes, wherein the electric field controller stores, for each of the plurality of pixels, a corresponding relationship between a voltage true value and a gray-scale value of an interference fringe pattern, the electric field controller applies a first voltage having higher than a first voltage true value of a first pixel to a first pixel electrode provided for the first pixel, and applies a second voltage having lower than a second voltage true value of a second pixel to a second pixel electrode provided for the second pixel, which is adjacent to the first pixel electrode provided for the first pixel, the first voltage true value indicates the voltage true value corresponding to the gray-scale value of the interference fringe pattern corresponding to the first pixel, and the second voltage true value indicates the voltage true value corresponding to the gray-scale value of the interference fringe pattern corresponding to the second pixel, and the gray-scale value for the first pixel is a peak value of a gray-scale variation curve for the interference fringe pattern.

2. The interference fringe pattern recording apparatus according to claim 1, wherein the electric field controller sets the voltage to be applied to the second pixel electrode adjacent to the first pixel electrode to zero and applies, to the first pixel electrode, a voltage higher than the first voltage true value.

3. A three-dimensional hologram image display system, which includes an interference fringe pattern recording apparatus and a server, and displays a three-dimensional hologram image by reference wave irradiation, wherein the server comprises;

an interference fringe pattern computer configured to compute an interference fringe pattern created from an object wave and a reference wave;

a storage configured to store a corresponding relationship between an interference fringe pattern and a gray-scale value; and a transmitter configured to transmit voltage values associated with the gray-scale value of the interference fringe pattern to the interference fringe pattern recording apparatus; and wherein the interference fringe pattern recording apparatus comprises:

a light modulation device in which a refractive index of each of a plurality of pixels is varied based on an electric field intensity of each of the plurality of pixels; and an electric field controller configured to control a voltage to be applied to each of a plurality of the pixel electrodes provided for each of the plurality of pixels, wherein the electric field controller stores, for each of the plurality of pixels, a corresponding relationship between a voltage true value and a gray-scale value of the interference fringe pattern, the electric field controller applies a first voltage having higher than a first voltage true value of a first pixel to a first pixel electrode provided for the first pixel, and applies a second voltage having lower than a second voltage true value of a second pixel to a second pixel electrode provided for the second pixel, which is adjacent to the first pixel electrode provided for the first pixel, the first voltage true value indicates the voltage true value corresponding to the gray-scale value of the interference fringe pattern corresponding to the first pixel, and the second voltage true value indicates the voltage true value corresponding to the gray-scale value of the interference fringe pattern corresponding to the second pixel, and the gray-scale value for the first pixel is a peak value of a gray-scale variation curve for the interference fringe pattern.

4. The three-dimensional hologram display system according to claim 3, wherein the electric field controller sets the voltage to be applied to the second pixel electrode adjacent to the first pixel electrode to zero, and applies to the first pixel electrode, a voltage higher than the first voltage true value.

* * * * *